United States Patent
Krafcik

(10) Patent No.: US 6,264,261 B1
(45) Date of Patent: Jul. 24, 2001

(54) VEHICLE CONSOLE

(75) Inventor: John F. Krafcik, Ann Arbor, MI (US)

(73) Assignee: Ford Global Tech., Inc., Dearborn, MI (US)

( * ) Notice: Subject to any disclaimer, the term of this patent is extended or adjusted under 35 U.S.C. 154(b) by 0 days.

(21) Appl. No.: 09/467,704

(22) Filed: Dec. 20, 1999

(51) Int. Cl.$^7$ ................ B60N 3/12; B60R 7/00; B60R 11/06

(52) U.S. Cl. ............ 296/37.8; 296/65.03; 297/256.16; 297/188.21

(58) Field of Search .................. 296/37.1, 37.8, 296/37.14, 64, 65.03; 297/256.16, 250.1, 188.4

(56) References Cited

U.S. PATENT DOCUMENTS

| | | |
|---|---|---|
| 1,306,498 | 6/1919 | Moses . |
| 3,193,326 | 7/1965 | Smith . |
| 4,341,415 | 7/1982 | Braun et al. . |
| 4,685,729 | 8/1987 | Heesch et al. . |
| 4,756,573 | 7/1988 | Simin et al. . |
| 4,832,241 | 5/1989 | Radcliffe . |
| 4,938,401 | 7/1990 | Weisbrodt et al. . |
| 5,116,097 | 5/1992 | Bulgari . |
| 5,487,588 | 1/1996 | Burleigh et al. . |
| 5,551,750 | 9/1996 | Yoshimura . |
| 5,601,334 | 2/1997 | Marks . |
| 5,611,589 | 3/1997 | Fujii et al. . |
| 5,639,144 | 6/1997 | Naujokas . |
| 5,816,651 | 10/1998 | Feuerherdt . |
| 5,918,934 * | 7/1999 | Siegrist . |
| 5,941,601 * | 8/1999 | Scott et al. . |
| 5,951,084 * | 9/1999 | Okazaki et al. . |
| 6,135,529 * | 10/2000 | De Angelis et al. . |

* cited by examiner

Primary Examiner—D. Glenn Dayoan
Assistant Examiner—Scott Carpenter
(74) Attorney, Agent, or Firm—Ford Global Tech.

(57) ABSTRACT

A vehicle console 12 which is adapted to store a child safety seat 50 and which is further adapted to operatively and movably support and position the child safety seat 50 within the vehicle 10. More particularly, the console 12 includes a pair of child seat attachment members 24, 26 which removably connect the child safety seat to the console 12, and a lip or flange portion 19 which allows the child safety seat 50 to be securely supported by the console 12 when deployed within the vehicle 10.

20 Claims, 2 Drawing Sheets

US 6,264,261 B1

VEHICLE CONSOLE

FIELD OF THE INVENTION

This invention relates to a vehicle console and more particularly, to a console which is movably contained within a vehicle and which is adapted to selectively and operatively support a child safety seat.

BACKGROUND

Consoles are normally and fixedly deployed within a vehicle and, more particularly, are typically deployed in close proximity to the driver's "position" or seat. The consoles are adapted to removably contain and/or store items and/or goods and are further adapted to allow the goods to be selectively utilized within the vehicle. Typically, these consoles occupy one or more vehicle areas or regions which normally contain and/or include a passenger seat. While it is desirable to have or provide a relatively large amount of console type storage space within the vehicle, it is not usually or typically desirable to reduce the amount of vehicle seating space, since the amount of such seating space limits the number of passengers that may comfortably reside within the vehicle. The amount of storage space and/or the size of the provided console is therefore typically limited by the amount of passenger seating space which is desired to be relinquished or "sacrificed" in order to provide such storage space.

Moreover, these vehicle storage consoles are typically fixed within or stationarlly positioned within the vehicle and require a user to be seated or positioned in close proximity to a console in order to access or utilize the console. Hence, passengers residing within the "back seat" or the rear of the passenger compartment do not have ready access to the console. The stationary positioning of the console within the vehicle thereby limits the overall utility of the console.

Therefore it may be desirable to provide a storage console which allows for the placement of additional seating within the vehicle and which is movably disposed within the vehicle, thereby allowing the console to be used or deployed in several positions while concomitantly allowing the provided seating to be selectively deployed in a desired location within the vehicle.

SUMMARY OF THE INVENTION

It is a first object of the present invention to provide a vehicle console which overcomes some or all of the previously delineated drawbacks of prior vehicle consoles.

It is a second object of the present invention to provide a vehicle console which overcomes some or all of the previously delineated drawbacks of prior vehicle consoles and which is movably disposed within a vehicle.

It is a third object of the present invention to provide a vehicle console which overcomes some or all of the previously delineated drawbacks of prior vehicle consoles and which is adapted to selectively store and supportably dispose a child safety seat within a vehicle.

It is a fourth object of the present invention to provide a vehicle console which overcomes some or all of the previously delineated drawbacks of prior consoles and which selectively stores a child safety seat.

According to a first aspect of the present invention, a vehicle console is provided which selectively and supportably receives a child safety seat and movably and operatively positions a child safety seat within the vehicle.

According to a second aspect of the present invention a console for use within a vehicle is provided. The console includes a hollow body having an opening which allows an object to be selectively placed within the body; at least one member which is coupled to the hollow body and to the vehicle and which allows the body to be selectively movable within the vehicle; and a cover which is movably coupled to the body portion and which is movable from a first position in which the cover overlays the opening to a second position.

These and other features, aspects, and advantages of the present invention will become apparent from a consideration of the following detailed description of the preferred embodiment of the invention when taken in combination with the attached drawings.

DETAILED DESCRIPTION OF THE PREFERRED EMBODIMENT OF THE INVENTION

Figure 1:
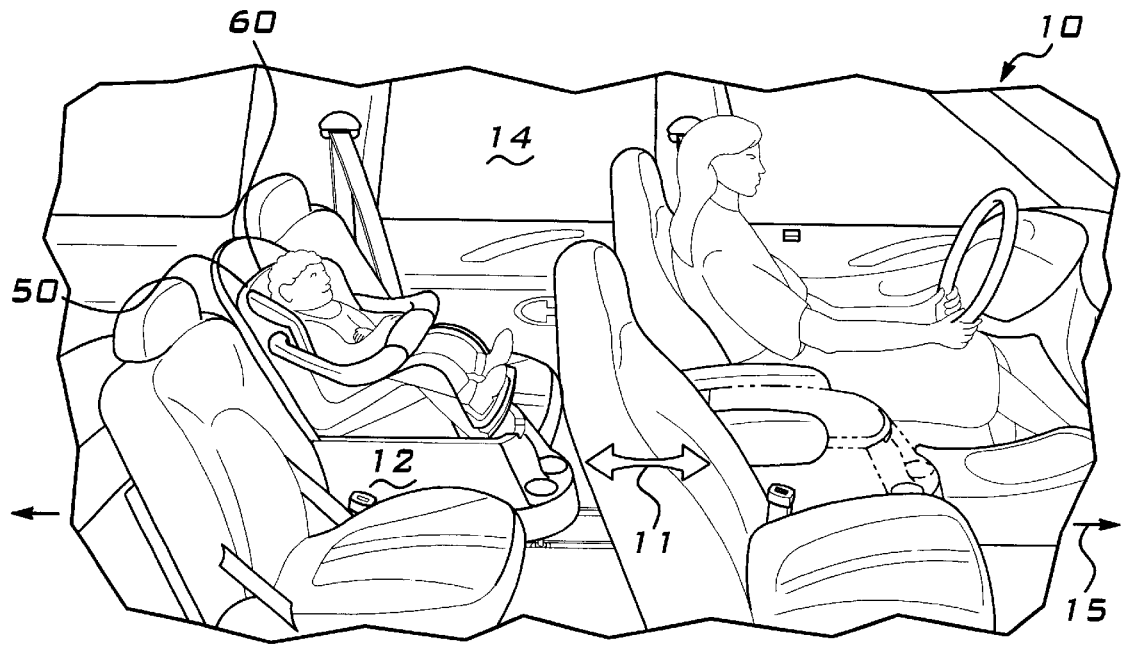
FIG. 1 is a fragmented perspective view of a vehicle which employs a console which is made in accordance with the teachings of the preferred embodiment of the invention.

Referring now to FIG. 1, there is shown a vehicle 10 having a console 12 which is made in accordance with the teachings of the preferred embodiment of the invention, which is movably deployed within the passenger compartment 14 and which is selectively adapted to supportably receive a typical and conventional child safety seat 50, and to allow the child safety seat to be movably disposed within the vehicle 10.

Figure 2:
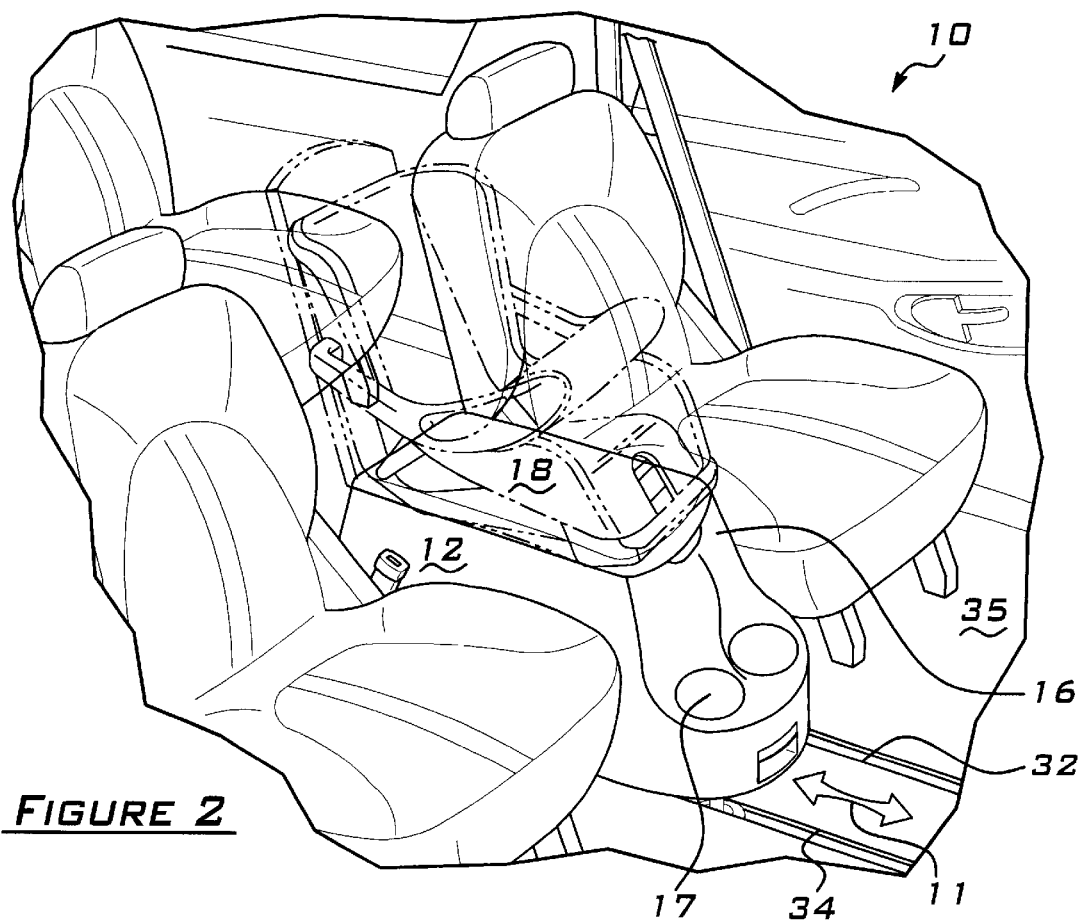
FIG. 2 is a perspective view of the console which is shown in FIG. 1 and which is operatively placed in the front of the vehicle passenger compartment.
Figure 3:
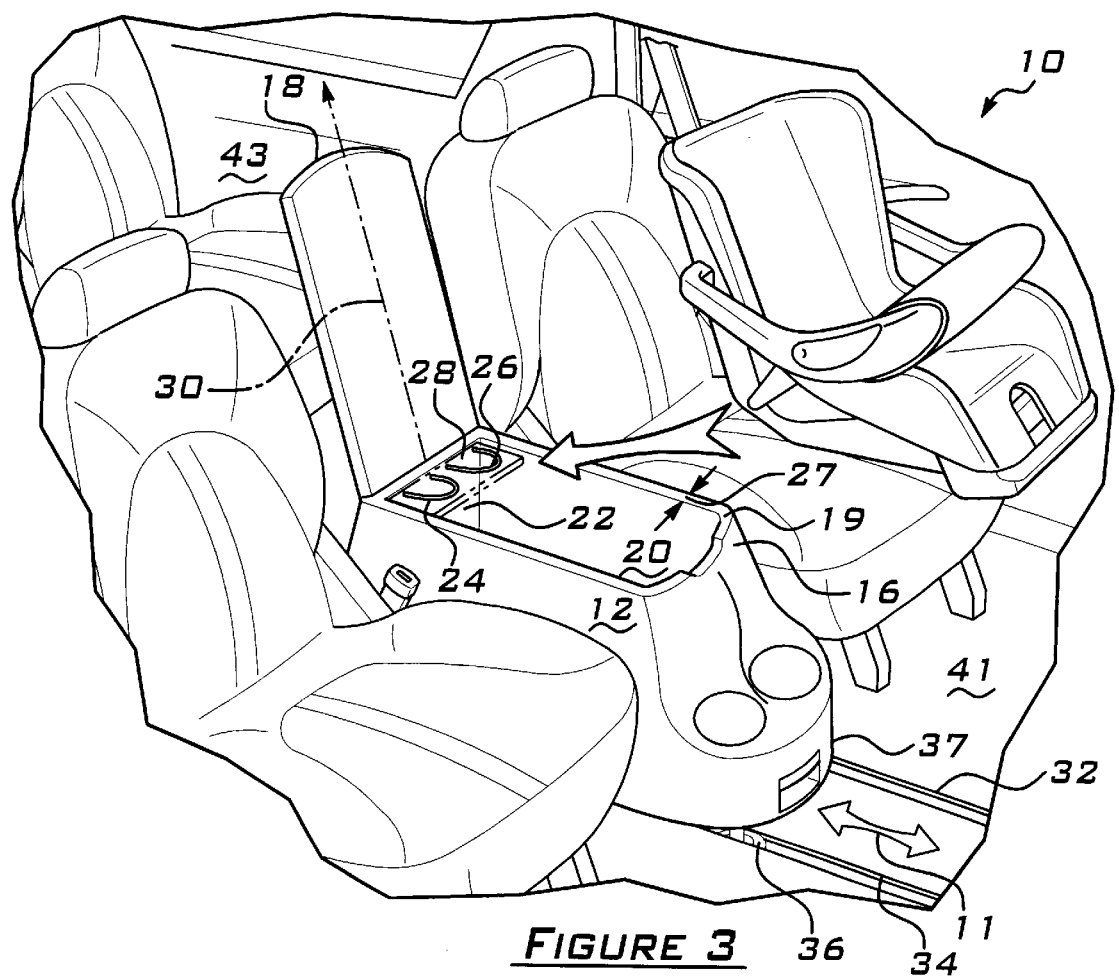
FIG. 3 is a view similar to that of FIG. 2 but which shows the selective placement of a child safety seat upon the console.
Figure 4:
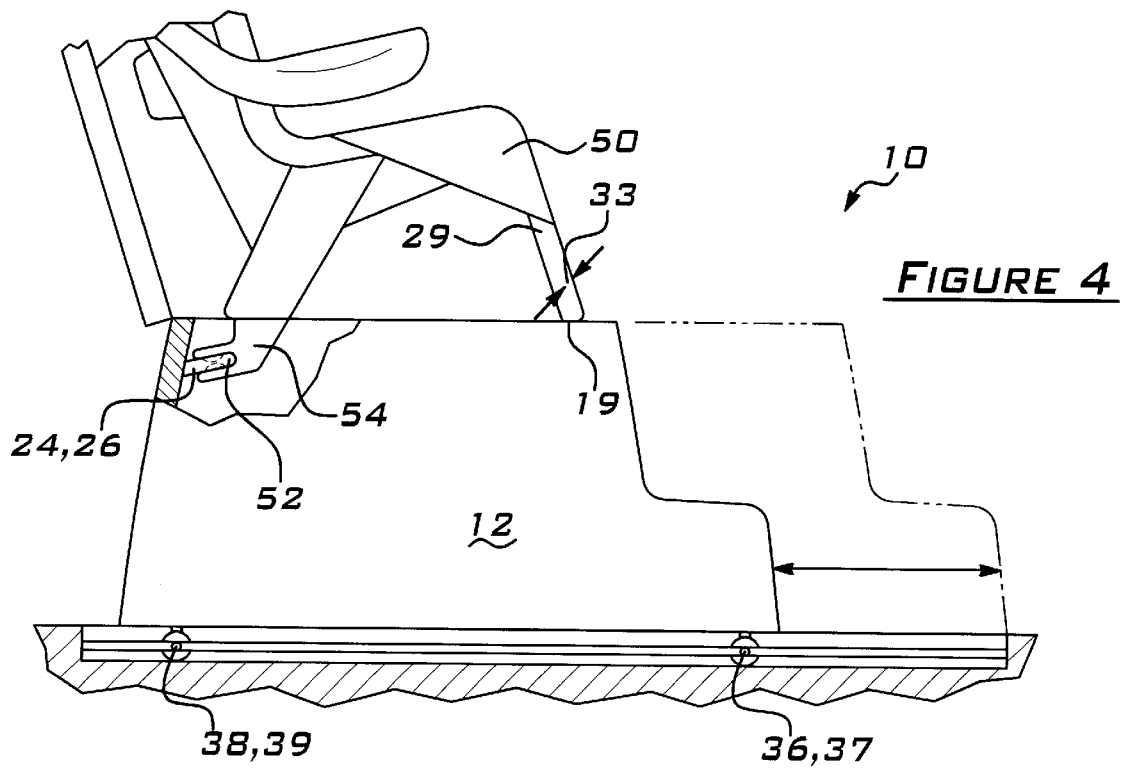
FIG. 4 is a fragmented side view of the console which is shown in FIGS. 1 and 2 and which supportably and operatively supports a typical and conventional child safety seat and which allows the child safety seat to be movably disposed within the vehicle.

Particularly, as best shown in FIGS. 2–4, console 12 includes a generally hollow body 16 which may be of substantially any desired shape and which is of a size which, in one non-limiting embodiment, allows the body 16 to selectively and removably store the child safety seat 50. Body 16 includes a cover member or portion 18 which is movably and/or hingeably coupled or connected to body 16 and, more particularly, which is movable from a first closed position (shown best in FIG. 2) to an open position (shown best in FIGS. 1, 2, and 4). As shown best in FIG. 2, body 16 forms and/or includes a cavity 20 which is overlayed or hidden when cover 18 is in the first closed position, and open or accessible when the cover 18 is in the second or open position. In this manner, the child safety seat 50 which may be contained within cavity 20, in one non-limiting embodiment, is hidden from view when the cover member or portion 18 is moved to a closed position. Body 16 also may contain an integrally formed cup-holder 17 or other types of storage compartments.

Body 16 further includes a substantially planar back wall portion 22 having at least one and preferably two substantially identical child seat attachment members or mechanisms 24, 26. In one non-limiting embodiment of the invention, each member 24, 26 comprises a "hook" or an "Isofix"-type member and members 24, 26 are each wholly or substantially wholly contained in a plane 28 which is parallel to the longitudinal axis of symmetry 30 of cover 18 when the cover 18 is in a closed position. Plane 28 is also substantially parallel to the longitudinal axis of symmetry 15 of the vehicle 10 and is substantially perpendicular or orthogonal to back wall member or portion 22. Body 16 further includes a lip, edge, or flange portion 19 which generally conforms to the shape of body 16, which encircles the opening of cavity 20, and which has a substantially uniform width 27 which is substantially equal to the width 33 of each of the legs 29 of the child safety seat 50.

Vehicle 12 further includes a pair of tracks or grooves 32, 34 which are disposed upon the floor 35 of passenger compartment 14, substantially along the longitudinal axis of symmetry 15 of the vehicle 12, and which movably receive wheels or roller members ("rollers") 36, 37, 38, and 39 which are disposed upon body 16. Particularly, the rollers 36, 38 are movably disposed within track 34 while rollers 37, 39 are movably disposed within track 32. In one non-limiting embodiment of the invention, rollers 36, 37, 38, and 39 are substantially identical and tracks or grooves 32, 34 are substantially identical. Roller members or wheels 36, 37, 38, and 39 cooperate with tracks 32, 34 to allow the console 12 to be selectively moved within the vehicle 10 in the direction which is indicated by arrow 11, thereby allowing the console 12 to be selectively used by passengers within the front portion 41 and/or the rear portion 43 of the passenger compartment 14 and increasing the overall utility of the console. In other non-limiting embodiments, tracks 32, 34 may comprise conventional seat type tracks or some other type of movement assembly or mechanism which allows console 12 to be movably disposed within vehicle 10 and which is generally and longitudinally disposed within the passenger compartment 14 and which extends between the front portion 41 and the rear portion 43.

In operation, a child safety seat 50 is stored within cavity 20 and hidden from view when cover member or portion 18 overlays the cavity 20. Other objects may similarly be stored within cavity 20 and hidden from view when the cover member or portion 18 overlays the cavity. Alternatively, seat 50 may be placed elsewhere within vehicle 10 and cavity 20 may not be adapted to store the child safety seat 50. When needed, the cover 18 is moved to the open position, shown best in FIG. 3, and the child safety seat 50 is removed from the cavity 20 and supported upon the flange portion 19, and the conventional attachment portions 52, 54 are fixedly coupled to the portions 24, 26. Since the width 27 of flange portion 19 is substantially equal to the width 33 of each of the legs 29, the child safety seat 50 is securely disposed upon the open console 12. Hence, portions 24, 26 cooperate with portions 52, 54 and portion 19 to allow the seat 50 to be securely fixed upon the flange portion 19 of the open console 12 while cover 18 abuttingly engages seat 50 and supports the back portion 60 of the seat 50. The secured seat 50 may be moved to a desired position within the vehicle 12 by use of the tracks 32, 34 and movably disposed wheels 36, 37, 38, and 39. In this manner, the seat 50 may be placed within a desired location within the vehicle 12 and the console 12 may be accessed by a relatively large number of vehicle occupants. Moreover, the child resident within the seat 50 may also be selectively movable within the passenger compartment 14, thereby allowing the driver of the vehicle 10 and those individuals residing within the back portion 43 of the passenger compartment 14 to have selective access to the child residing within the child safety seat 50.

It is to be understood that the invention is not limited to the exact construction or method which has been previously delineated, but that various changes and modifications may be made without departing from the spirit and the scope of the invention. Moreover, it should additionally be realized that the console 12 provides for relatively secure vehicle storage while concomitantly and selectively allowing for additional seating.

What is claimed is:

1. A console for use within a vehicle, said console comprising:
   a storage member which is movably disposed within said vehicle, said storage member comprising a hollow body portion having an opening which allows a child safety seat to be selectively placed within said storage member; and
   a child seat attachment member which is disposed within said storage member.

2. The console of claim 1 wherein said storage member comprises a hollow body portion having an opening which allows an object to be selectively placed within said storage member.

3. The console of claim 1 wherein said storage member further comprises a cover which is movable from a first position in which said cover overlays said opening to a second position.

4. The console of claim 1 wherein said console further comprises a lip which substantially surrounds said opening.

5. The console of claim 1 wherein said child seat attachment member comprises an Isofix member.

6. The console of claim 3 wherein said cover has a longitudinal axis of symmetry and wherein said child seat attachment member is wholly contained within a plane which is parallel to said longitudinal axis of symmetry of said cover when said cover is selectively placed in said first position.

7. The console of claim 1 further including a cup holder.

8. The console of claim 4 wherein said child safety seat comprises at least one leg having a certain width.

9. The console of claim 8 wherein said lip has a width which is substantially equal to said width of said at least one leg.

10. The console of claim 8 wherein said vehicle has a pair of tracks and wherein said console further includes a plurality of wheels which cooperate with said pair of tracks to allow said console to be movably disposed within said vehicle.

11. The console of claim 10 wherein said vehicle has a longitudinal axis of symmetry and wherein said console is constrained to move only along said longitudinal axis of symmetry of said vehicle.

12. An assembly for use within a vehicle of the type having a passenger compartment with a front and a rear portion, said assembly comprising:
    a movement assembly which is longitudinally disposed within said passenger compartment between said front and said rear portion; and
    a console having an opening which allows a child safety seat to be selectively placed within said console and which is coupled to said movement assembly and which is selectively movable, by use of said movement assembly, between said front and said rear portion of said passenger compartment and which includes a pair of child seat attachment members.

13. The assembly of claim 12 wherein said pair of attachment members each comprises an Isofix member.

14. The assembly of claim 12 wherein said movement assembly comprises a pair of tracks.

15. The assembly of claim 14 wherein said console includes a plurality of rollers which are each movably disposed within one of said pair of tracks.

16. The assembly of claim 15 wherein said rollers cooperate with said pair of tracks to allow said console to be selectively movable within said passenger compartment.

17. An assembly for use within a vehicle having a floor and further having a passenger compartment including a front portion and a rear portion, said assembly comprising:

a storage member which is selectively movable between said front portion and said rear portion, said storage member having a cavity of a certain shape, a back wall, and a lip portion which substantially conforms to said certain shape of said cavity;

a pair of child seat attachment mechanisms which are disposed upon said back wall and which are wholly contained within a plane which is substantially parallel to said floor of said vehicle; and a cover which is movably connected to said storage member and which is selectively movable to an open position, thereby allowing access to said cavity.

18. The assembly of claim 17 further comprising a child safety seat which is selectively movable to an operative position in which said child safety seat is disposed upon said lip portion and is coupled to said pair of child seat attachment mechanisms.

19. The child safety seat assembly of claim 18 wherein said child safety seat is adapted to be selectively placed within said cavity.

20. The child seat assembly of claim 19 wherein said storage member includes at least one integrally formed cup holder.

* * * * *